(12) United States Patent
Sawada

(10) Patent No.: US 9,800,089 B2
(45) Date of Patent: Oct. 24, 2017

(54) ROBOT

(71) Applicant: Seiko Epson Corporation, Tokyo (JP)

(72) Inventor: Munenori Sawada, Matsumoto (JP)

(73) Assignee: Seiko Epson Corporation (JP)

( * ) Notice: Subject to any disclaimer, the term of this patent is extended or adjusted under 35 U.S.C. 154(b) by 36 days.

(21) Appl. No.: 14/885,133

(22) Filed: Oct. 16, 2015

(65) Prior Publication Data

US 2016/0118915 A1    Apr. 28, 2016

(30) Foreign Application Priority Data

Oct. 22, 2014 (JP) ................ 2014-215124

(51) Int. Cl.
  *H02P 1/54* (2006.01)
  *H02J 9/06* (2006.01)
  *H02J 7/34* (2006.01)

(52) U.S. Cl.
  CPC ............ *H02J 9/061* (2013.01); *H02J 7/34* (2013.01)

(58) Field of Classification Search
  CPC ............ H02P 5/00; H02J 7/34; H02J 9/061
  USPC .................................................. 318/5
  See application file for complete search history.

(56) References Cited

U.S. PATENT DOCUMENTS

| | | | | |
|---|---|---|---|---|
| 5,170,109 A | * | 12/1992 | Yanagita | G05B 19/4067 307/64 |
| 5,977,659 A | * | 11/1999 | Takehara | H02J 3/383 307/126 |
| 6,445,979 B1 | * | 9/2002 | Inoue | B25J 9/1684 318/565 |
| 7,932,632 B2 | * | 4/2011 | Zhang | H02H 7/1213 307/43 |
| 2011/0108536 A1 | * | 5/2011 | Inada | B23K 9/0953 219/130.1 |
| 2011/0307910 A1 | * | 12/2011 | Nagasato | H02M 1/32 720/695 |
| 2013/0015711 A1 | * | 1/2013 | Laceky | H02J 1/10 307/64 |
| 2015/0150428 A1 | * | 6/2015 | Park | A47L 11/4005 134/18 |
| 2015/0156846 A1 | * | 6/2015 | Cao | H05B 33/0887 315/122 |

FOREIGN PATENT DOCUMENTS

| | | |
|---|---|---|
| JP | 2006-116679 A | 5/2006 |
| JP | 2012-223881 A | 11/2012 |

* cited by examiner

*Primary Examiner* — Eduardo Colon Santana
*Assistant Examiner* — Gabriel Agared
(74) *Attorney, Agent, or Firm* — Harness, Dickey & Pierce, P.L.C.

(57) ABSTRACT

A robot includes a first power supply that outputs first voltage, a first circuit that operates with the first voltage, a second power supply that outputs second voltage, a second circuit that operates with the second voltage, and a first protection section that causes the first circuit to operate based on the second voltage when the first power supply stops outputting the first voltage.

7 Claims, 2 Drawing Sheets

ROBOT

BACKGROUND

1. Technical Field

The present invention relates to a robot.

2. Related Art

In a circuit of related art for driving a robot, there is a known technology for duplicating a variety of circuits for improvement in failure resistance and other purposes. For example, JP-A-2006-116679 discloses a power supply board including a plurality of auxiliary power supply circuits.

Employing the configuration in which a plurality of auxiliary power supply circuits are simply provided, as in the technology of related art described above, undesirably increases the size of the power supply board and complicates the circuit configuration.

SUMMARY

An advantage of some aspects of the invention is to improve the failure resistance of a power supply by using a simple configuration.

A robot according to an aspect of the invention includes a first power supply that outputs first voltage, a first circuit that operates with the first voltage, a second power supply that outputs second voltage, a second circuit that operates with the second voltage, and a first protection section that causes the first circuit to operate based on the second voltage when the first power supply stops outputting the first voltage.

That is, in the robot including two types of power supply that output two types of voltage, the first power supply and the second power supply, and using the two types of voltage to cause a circuit as a component to operate, when one of the two types of power supply stops outputting voltage, the circuit having operated with the terminated voltage is caused to operate based on the voltage from the other one of the two types of power supply. Therefore, provided that each of the first and second power supplies is provided with no auxiliary power supply circuit, even when at least one of the two types of power supply stops outputting voltage due, for example, to failure, the circuit having operated with the voltage from the one of the two types of power supply can be caused to operate with the other one of the two types of power supply. The second power supply, which is inevitably necessary to cause the second circuit to operate, can also be used to cause the first circuit to operate. Failure resistance of a power supply can thus be improved by using a simple configuration.

The first power supply only needs to output the first voltage, and the first circuit only needs to be a circuit that operates with the first voltage. That is, in a configuration in which at least part of the first circuit operates with the first voltage, the first power supply only needs to be a power supply that causes the first circuit to operate. For example, in a conceivable configuration, the first power supply receives electric power supplied, for example, from a commercial power supply provided at the location where the robot is installed and includes a voltage conversion circuit that converts the voltage outputted from the commercial power supply into the first voltage. Of course, the first power supply may be capable of outputting a plurality of types of voltage (voltages having different voltage values, standards, frequencies, and other parameters, AC voltage, and DC voltage) including the first voltage, and the plurality of types of voltage may be considered as the first voltage. Further, the first protection section may protect a circuit that operates with part or entirety of the plurality of types of voltage outputted from the first power supply.

The first circuit only needs to be a circuit that forms part of the robot, and any of a variety of circuits can be the first circuit. It is, however, noted that the first circuit includes a circuit to be protected by the first protection section. Therefore, the first circuit preferably includes a circuit having high necessity to keep operating even when the first power supply stops outputting the first voltage or a circuit in which instantaneous stoppage thereof possibly induces greater failure.

The second power supply only needs to output the second voltage, and the second circuit only needs to be a circuit that operates with the second voltage. That is, in a configuration in which at least part of the second circuit operates with the second voltage, the second power supply only needs to be a power supply that causes the second circuit to operate. For example, in a conceivable configuration, the second power supply receives electric power supplied, for example, from a commercial power supply provided at the location where the robot is installed and includes a voltage conversion circuit that converts the voltage outputted from the commercial power supply into the second voltage. The second power supply may, of course, be capable of outputting a plurality of types of voltage (voltages having different voltage values, standards, frequencies, and other parameters, AC voltage, and DC voltage) including the second voltage.

The second voltage may or may not be equal to the first voltage. That is, as long as the two types of power supply are configured to cause the first and second circuits to operate, respectively, the value of the voltage outputted from each of the two types of power supply is not particularly limited to a specific value. A second protection section that causes the second circuit to operate based on the first voltage when the second power supply stops outputting the second voltage may further be provided.

The second circuit only needs to be a circuit that forms part of the robot. The first and second circuits may be formed on the same substrate or may be formed on different substrates. In the latter case, for example, in a conceivable configuration, circuits for achieving different types of function are formed on different substrates or in different enclosures. As the different types of function, for example, in a conceivable configuration, the first circuit achieves a function of directly sending and receiving electric power and signals to and from motors and other components of the robot, and the second circuit achieves a function of providing the first circuit with an instruction for controlling the action of the robot.

The first protection section only needs to be capable of causing the first circuit to operate based on the second voltage when the first power supply stops outputting the first voltage. That is, when the first circuit encounters a state in which it cannot operate based on the first voltage from the first power supply, the first protection section only needs to cause the first circuit to operate by using the second voltage. To protect the first circuit by using the second voltage, the first circuit may be so configured that it operates with the received second voltage, or the first circuit may instead be so configured that it produces the first voltage from the second voltage and receives the produced first voltage for operation.

In the latter case, for example, in an employable configuration, the first protection section includes a conversion section that converts the second voltage into the first voltage, and when the first power supply stops outputting the first voltage, the first protection section causes the first circuit to operate by using the first voltage produced by the conversion performed by the conversion section. According to the configuration described above, providing a voltage conversion circuit that converts the second voltage into the first voltage allows formation of a circuit for protecting the first circuit based on the second voltage, whereby failure resistance of a power supply can be improved by using an extremely simple configuration. The voltage value of the first voltage produced by the conversion performed by the conversion section is not required to be exactly equal to the first voltage, and the voltage value may vary within a range that allows the first circuit to operate.

A variety of configurations can be employed as the configuration in which in normal operation, the first circuit is provided with the first voltage from the first power supply, and when the first power supply stops outputting the first voltage, the voltage source is switched from the first power supply to the second power supply. For example, the first circuit may be so formed that each of the first voltage from the first power supply and the first voltage produced from the second power supply is supplied to the first circuit via a diode and the former first voltage is set to be slightly greater than the latter first voltage. According to the configuration described above, when the first power supply can output the first voltage, the first power supply outputs the first voltage to the first circuit, whereas when the first power supply stops outputting the first voltage, the first voltage produced by the conversion of the second voltage (voltage slightly smaller than first voltage) is provided to the first circuit.

Further, the following configuration may be employed: Stoppage of the output of the first voltage from the first power supply is detectable, and when the stoppage is detected, the first circuit is caused to operate based on the second voltage from the second power supply. In a conceivable configuration as the configuration described above, for example, the voltage outputted from the first power supply is detected, and when the output voltage becomes a voltage that can be considered to differ from the first voltage, an IC switches a switch in the first protection circuit in such a way that the first circuit is caused to operate based on the second voltage outputted from the second power supply.

Further, the stoppage of the output of the first voltage from the first power supply may be a trigger for causing the first circuit to operate based on the second voltage, and a cause of the stoppage may be failure of the first power supply, such as failure of a circuit in the first power supply or a broken wire in the circuit, or may be stoppage of electric power supply to the first power supply, such as power cut, or may be stoppage of the first power supply because a protection circuit functions due, for example, to generated heat. To protect the first circuit even when the commercial power supply or any other power supply stops supplying the second power supply with electric power due to power cut, the second circuit may include a battery. That is, employing a configuration in which the second voltage is outputted based on electric power from the battery when external electric power supply to the second power supply is stopped due, for example, to power cut allows the first circuit to operate based on the second voltage.

The stoppage of the output of the first voltage from the first power supply is a situation in which the output from the first power supply is not normally supplied to the first circuit and includes, for example, a case where the output voltage value becomes smaller or greater than the first voltage by at least a predetermined value. A case where an element other than the voltage value, for example, the frequency becomes a value that does not fall within a predetermined range may, of course, be considered as the state in which the first power supply stops outputting the first voltage.

Further, since the first circuit is configured to reliably operate even when the output of the first voltage is stopped, the first circuit is preferably a circuit that should avoid instantaneous stoppage of operation thereof. As an example of a configuration in which the first circuit is such a circuit, the first circuit includes an error recording section that carries out processes of acquiring an error having occurred in a component of the robot and recording the error in a nonvolatile memory.

That is, in the course of driving operation of the robot, an error that makes it difficult to cause the robot to act could occur, for example, when a component of the robot performs action beyond a predetermined limit (for example, when a drive unit acts to a position beyond a predetermined limit) or when a component of the robot enters a state beyond a predetermined limit (for example, when overcurrent or overvoltage occurs or when heat beyond a predetermined limit is generated). In such a case, it is necessary, after an error occurs, to analysis a cause of the error for prevention of reoccurrence and other purposes. To this end, employing a configuration in which the first circuit acquires an error having occurred in a component of the robot and records the error in a nonvolatile memory and analyzing an error log recorded in the nonvolatile memory allow analysis of the cause of the error.

In the configuration described above, in a state in which the robot is forced to stop being driven due to occurrence of an error, when the first power supply stops supplying the first voltage to the first circuit before the error (information representing error) is recorded in the nonvolatile memory, the error is not recorded and hence a cause of the error cannot be analyzed. To avoid the situation, in a case where the configuration in which the first circuit acquires an error and records the error in the nonvolatile memory is employed, reconfiguring the configuration in such a way that the first circuit is caused to operate based on the second voltage when the output of the first voltage is stopped allows handling a case where the robot is forced to stop being driven due to occurrence of an error in such a way that at least a cause of the error can be analyzed.

An error can be defined in a variety of aspects. For example, in an employable configuration, an ID is given to each component of the robot, it is considered that an error has occurred when a component of the robot performs action beyond a predetermined limit or enters a state beyond a predetermined limit, and the ID representing the component in which the error has occurred is acquired as an error. Of course, in a case where a plurality of causes of errors are conceivable in a single component, an ID may be given for each cause of an error, and when an error occurs, the ID representing a cause of the error may be acquired as an error.

A variety of configurations can be employed as a configuration for detecting occurrence of an error. For example, in an employable configuration, it is detected that an error has occurred when a sensor that detects the position, acceleration, or any other parameter of a drive unit of the robot, a sensor that detects voltage, current, temperature, or any other parameter, or any other component outputs a value beyond a predetermined limit. It is, of course, considered that when any of a variety of protection circuits functions, an error has occurred in a component to be protected.

A variety of elements are conceivable as a component of the robot, and every element that forms the robot can be a component from which an error is acquired. Therefore, a circuit that is part of the first circuit (circuit other than circuit that acquires and records error) may be the component, a circuit that forms the first power supply may be the component, or the second power supply or the second circuit may be the component. When the first power supply as a circuit for supplying the first circuit with the first voltage is a component of the robot as an error monitored subject, and even when the first power supply stops outputting the first voltage due, for example, to an error, such as failure, the error recording section can keep operating based on the second voltage, whereby post-analysis of the occurrence of the error in the first power supply can be performed.

The nonvolatile memory may or may not be incorporated in the first circuit. In the latter case, for example, the nonvolatile memory may be connected to the second circuit, the first circuit may output information representing an acquired error to the second circuit, and the second circuit may acquire the information representing the error and records the information in the nonvolatile memory. In the configuration described above, when the output of the first voltage is stopped, the first circuit only needs to operate for a period required at least to acquire information representing an error and output the information to the second circuit. To this end, since the first circuit only needs to operate for a very short period, the first protection section can be simply configured.

Further, the approach of the aspect of the invention described above, in which when one of the two types of power supply stops outputting electric power, the other one of the two types of power supply supplies electric power, is applicable as a method. Further, the robot to which the invention is applied may be provided in the form of a robot system including a control unit or any other component that controls the robot and cooperates with a variety of apparatus, and such a robot system can employ a variety of other configurations.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
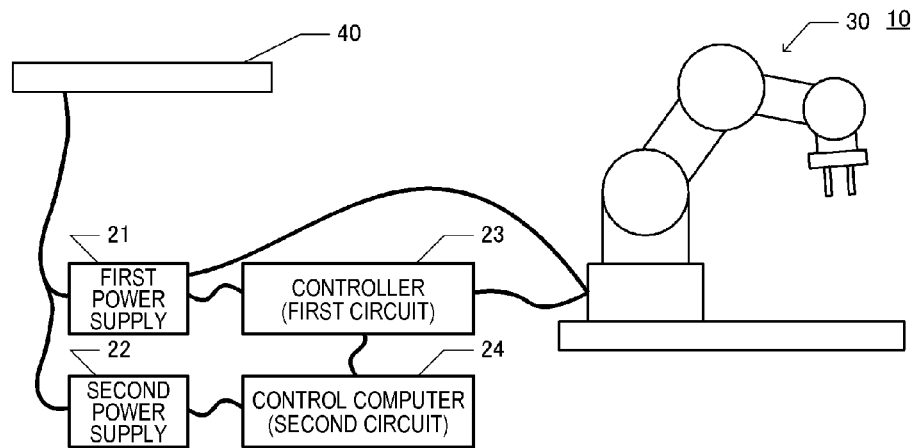
FIG. 1A is a block diagram showing a robot according to an embodiment of the invention.

An embodiment of the invention will be described in the following order.
(1) Configuration of robot
(2) Configuration for improving failure resistance of first power supply
(2-1) Configuration of first protection section
(3) Other embodiments (1) Configuration of Robot FIG. 1A is a block diagram showing the configuration of a robot 10, which is an embodiment of the invention. The robot 10 according to the present embodiment includes a first power supply 21, a second power supply 22, a controller 23, a control computer 24, and a drive unit 30. The drive unit 30 includes a plurality of movable sections driven with a plurality of motors. In FIG. 1A, the movable sections are formed of an end effector connected to the front end of an arm and joints (rotary supports) of the arm. In the present embodiment, the drive unit 30 includes a camera for capturing an image of a workpiece or any other object and an LED display, not shown, for displaying an alarm or any other message at the time of failure.

The first power supply 21 includes a circuit that produces electric power to be supplied to the controller 23 and the drive unit 30 by using electric power from a commercial power supply 40 having a predetermined standard (such as predetermined voltage and frequency). That is, the first power supply 21 includes a circuit that is connected to the commercial power supply 40, acquires predetermined AC electric power from the commercial power supply, and produces electric power having three types of voltage (three-phase 280-V AC power, 24-V DC power, and 8-V DC power). The three-phase 280-V AC power produced by the first power supply 21 is provided via a power line to a motor that is not shown but is accommodated in the drive unit 30. The 24-V DC power and the 8-V DC power produced by the first power supply 21 are provided to the controller 23 via power lines.

The controller 23 includes firmware (firmware 23b, which will be described later) that controls the action of the drive unit 30 and a control section (display control section 23a, which will be described later) circuit that controls the LED display provided in the drive unit 30. That is, the controller 23 is connected to the control computer 24 via a communication line, and the firmware acquires an action instruction from the control computer 24 and identifies control signals for causing the joints, the end effector, and the camera to operate in accordance with the action instruction. The firmware then outputs the identified control signals to the components to be controlled.

For example, when the firmware has acquired an action instruction that causes a joint of the drive unit 30 to rotate, the firmware identifies a rotation angle and other parameters of a motor that are necessary for the rotation of the joint and identifies a control signal that causes the shaft of the motor to rotate by the rotation angle (signal that causes switching device to perform PWM control). The firmware then outputs the identified control signal to an inverter (power conversion section 21d, which will be described later) in the first power supply 21. As a result, the first power supply 21 outputs three-phase AC power for rotating the joint in accordance with the action instruction, and the motor in the shaft of the drive unit 30 is rotated to rotate the joint.

When the firmware has acquired an action instruction that instructs acquisition of an image captured with the camera in the drive unit 30, the firmware outputs a control signal to the camera to cause it to output image information. As a result, the firmware acquires the image information and transmits the image information to the control computer 24 via a communication line.

Further, the controller 23 is connected to the LED display in the drive unit 30 via a 24-V power line and a communication line, and the display control section, which controls the LED display, outputs a control signal to the LED display to cause it to display an image (such as alarm image at the time of failure). As a result, the LED display displays the image.

The second power supply 22 includes a circuit that produces electric power to be supplied to the control computer 24 by using the electric power from the commercial power supply 40. That is, the second power supply 22 includes a circuit that is connected to the commercial power supply 40, acquires predetermined AC power from the commercial power supply, and produces electric power of a plurality of kinds of voltage by using an electric power conversion section including a converter and an inverter. The control computer 24 in the present embodiment is formed of general-purpose components, and a program execution circuit formed of a CPU, a RAM, a ROM, and other components is formed on a substrate (mother board) that complies with a predetermined standard. The second power supply 22 is therefore also a power supply configured to output DC voltages of 12 V, 5 V, and 3.3 V, which comply with the predetermined standard, that is, a power supply that complies with the ATX standard.

The control computer 24, which includes the program execution circuit, can execute an arbitrary program created in advance and recorded in a nonvolatile memory. In the present embodiment, the program includes a drive control program for controlling the action of the drive unit 30. That is, when the control computer 24 executes the drive control program, the control computer 24 issues an action instruction that instructs the firmware in the controller 23 to cause the drive unit 30 to act. For example, the control computer 24 issues an action instruction to the firmware to cause it to acquire information on an image captured with the camera. As a result, the firmware controls the camera to acquire the image information and transmits the image information to the control computer 24.

The control computer 24 then analyzes the image information to identify an intended position and angle of each section (joints and end effector) of the drive unit 30. The control computer 24 then outputs an action instruction for each section to the firmware. As a result, the firmware drives each section of the drive unit 30 based on the action instruction. As described above, in the present embodiment, the controller 23 and the control computer 24 cooperate with each other to cause the drive unit 30 to perform a predetermined task. The control computer 24 may include other components, for example, an input section that accepts a user's input and an output section that outputs image information, voice information, and other types of information to the user.

(2) Configuration for Improving Failure Resistance of First Power Supply

In the configuration described above, the firmware further functions as an error recording section that acquires an error having occurred in a component of the robot 10 and records the error in a nonvolatile memory. That is, in the present embodiment, when at least part of the components of the robot 10 performs action that does not fall within a predetermined range, it is determined that an error has occurred, and information representing that an error has occurred is recorded.

Figure 1B:
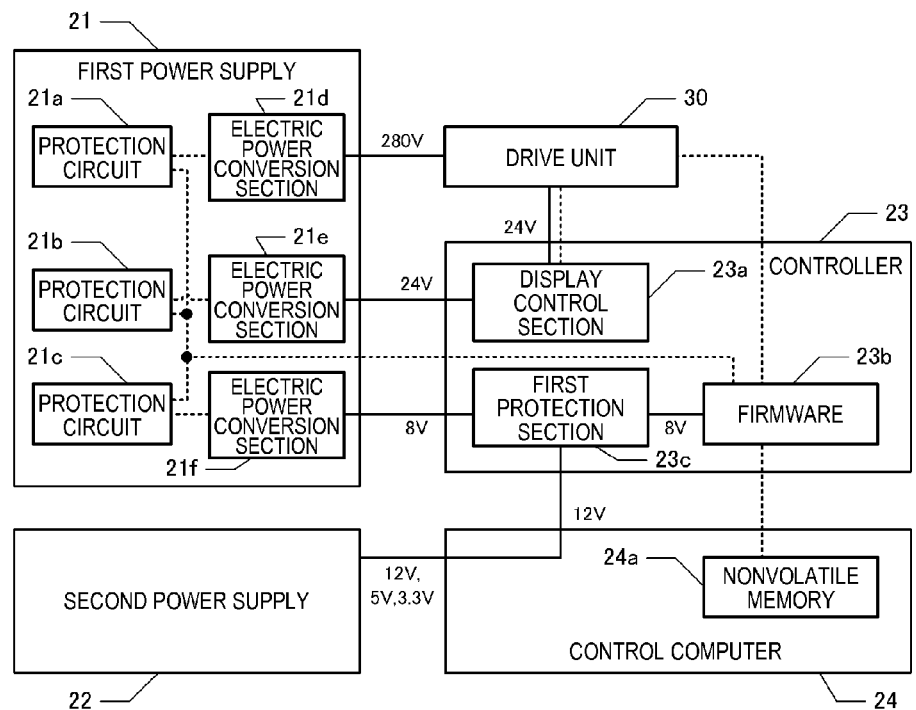
FIG. 1B shows the configuration for improving failure resistance of a first power supply.

Specifically, monitored subjects under monitoring whether or not an error has occurred are determined in advance, and a sensor for detecting that an error has occurred is connected to each of the monitored subjects and outputs a result of detection that is acquired by the firmware. FIG. 1B is a block diagram showing key portions of the first power supply 21, the controller 23, and the control computer 24, the second power supply 22, and the drive unit 30. In FIG. 1B, the solid lines represent power lines, and the broken lines represent signal lines.

The first power supply 21 includes an electric power conversion section 21d, in which a converter and an inverter produce the 280-V AC power based on the output from the commercial power supply 40, an electric power conversion section 21e, in which a converter produces the 24-V DC power based on the output from the commercial power supply 40, and an electric power conversion section 21f, in which a converter produces the 8-V DC power based on the output from the commercial power supply 40. The 280-V AC power is electric power that causes the motors in the drive unit 30 to operate. The 24-V DC power is electric power that causes the display control section 23a in the controller 23 to operate. The 8-V DC power is electric power that causes the firmware 23b in the controller 23 to operate. To the electric power conversion sections 21d, 21e, and 21f are connected protection circuits 21a, 21b, and 21c, which monitor current, voltage, and heat in the circuits in the electric power conversion sections 21d, 21e, and 21f and stop the functions of the circuits when overcurrent or overvoltage occurs or when heat beyond a predetermined limit is generated. Each of the protection circuits 21a, 21b, and 21c can be formed of a variety of known circuits.

Each of the protection circuits 21a, 21b, and 21c is connected to the firmware 23b via a signal line. Each of the protection circuits 21a, 21b, and 21c is provided with a register that changes a value thereof when the protection circuit performs the function of stopping the corresponding one of the electric power conversion sections 21d, 21e, and 21f, and the resister is provided for each cause of the stoppage (such as overcurrent, overvoltage, and generation of heat beyond a predetermine limit). The firmware 23b can therefore detect that an error has occurred and identify a cause of the occurrence of the error based on the values of the registers in the protection circuits 21a, 21b, and 21c. That is, when the firmware 23b detects that an error has occurred based on the values of the registers in the protection circuits 21a, 21b, and 21c, the firmware 23b determines that an error has occurred in the electric power conversion sections 21d, 21e, and 21f connected to the protection circuits 21a, 21b, and 21c and identifies a cause of the occurrence of the error. That is, the electric power conversion sections 21d, 21e, and 21f are monitored subjects to be monitored by the firmware 23b via the protection circuits 21a, 21b, and 21c in terms of presence and absence of an error and a cause of the occurrence of the error.

In the present embodiment, other monitored subjects are also monitored by the same configuration in terms of presence and absence of an error and a cause of the occurrence of the error. For example, to each of the motors provided in the drive unit 30 is attached a sensor for determining whether or not the action of the motor is beyond a predetermined limit. The sensor is provided with a register that changes a value thereof when the action is beyond the predetermined limit, and the resister is provided for each cause of occurrence of an error. The firmware 23b can therefore detect presence and absence of an error and identify a cause of the occurrence of the error in each of the monitored subjects based on the value of the register for the monitored subject.

The firmware 23b communicates with the control computer 24 on a regular basis. In the communication, the firmware 23b outputs a flag representing whether or not an error has occurred for each of the monitored subjects and for each cause of the occurrence of the error to the control computer 24. The control computer 24 includes a nonvolatile memory 24a and records the flag representing whether or not an error has occurred for each of the monitored subjects and for each cause of the occurrence of the error in the nonvolatile memory 24*a*. Therefore, in the present embodiment, when an error has occurred in a component of the robot 10, referring to the information recorded in the nonvolatile memory 24*a* allows identification of the location where the error has occurred and a cause of the occurrence of the error.

In the configuration described above, the firmware 23*b* acquires information representing a monitored subject in which an error has occurred and a cause of the occurrence of the error. On the other hand, the 8-V DC power that causes the firmware 23*b* to operate is produced by the electric power conversion section 21*f*. Therefore, when failure has occurred in a portion associated with the electric power conversion section 21*f*, and if no measure is taken against the failure, the firmware 23*b* could undesirably stop operating before information representing the error is acquired (or before the information is recorded in the nonvolatile memory 24*a*). Further, when failure has occurred in a portion that is not associated with the electric power conversion section 21*f* and failure has occurred in a portion that is associated with the electric power conversion section 21*f*, the firmware 23*b* could undesirably stop operating before information representing the error having occurred in the portion that is not associated with the electric power conversion section 21*f* is acquired (or before the information is recorded in the nonvolatile memory 24*a*).

To avoid the situation described above, in the present embodiment, the controller 23 includes a first protection section 23*c*, which allows, even when failure has occurred in a portion associated with the electric power conversion section 21*f*, appropriate recording of information representing the error. The first protection section 23*c* includes a circuit that causes the firmware 23*b* to operate based on the 12-V voltage outputted from the second power supply 22 when the electric power conversion section 21*f* stops outputting the 8-V voltage. That is, in the present embodiment, the firmware 23*b* forms the first circuit, the control computer 24 forms the second circuit, the first voltage is 8 V, and the second voltage is 12 V.

(2-1) Configuration of First Protection Section

Figure 2A:
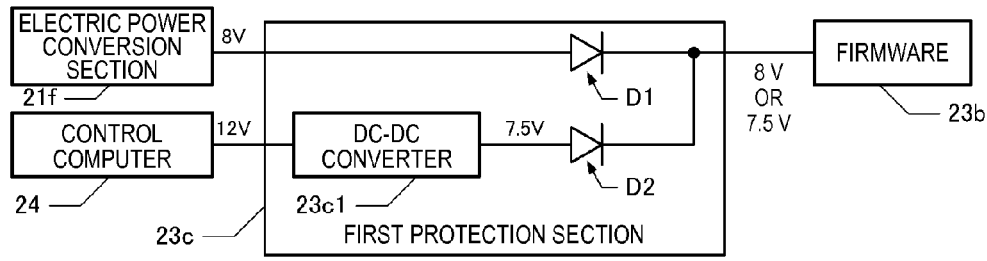
FIGS. 2A and 2B show examples of the configuration of a first protection section.

FIG. 2A is a block diagram showing the configuration of the first protection section 23*c*. The first protection section 23*c* includes diodes D1 and D2 and a DC-DC converter 23*c*1, as shown in FIG. 2A. The diode D1 is located in a power line that connects the electric power conversion section 21*f* to the firmware 23*b* and interposed between the electric power conversion section 21*f* and the firmware 23*b* with the electric power conversion section 21*f* connected to the anode of the diode D1 and the firmware 23*b* connected to the cathode thereof. The diode D1 is therefore so connected to the power line that the direction from the electric power conversion section 21*f* to the firmware 23*b* coincides with the forward direction of the diode D1.

The DC-DC converter 23*c*1 includes a circuit that converts the 12-V DC power into DC power having a voltage value slightly smaller than 8 V (7.5 V in the example shown in FIG. 2A). The DC-DC converter 23*c*1 is connected to the control computer 24 and the anode of the diode D2. In the present embodiment, the 12-V DC power is supplied from the second power supply 22 to the control computer 24, and the DC power is supplied from the control computer 24 to the first protection section 23*c* (see FIG. 1B). The DC-DC converter 23*c*1 converts the 12-V DC power into 7.5-V DC power and supplies the diode D2 with the converted DC power. The cathode of the diode D2 is connected to the power line to which the cathode of the diode D1 is connected. The diode D2 is therefore so connected to the power line that the direction from the DC-DC converter 23*c*1 to the firmware 23*b* coincides with the forward direction of the diode D2.

In the thus configured first protection section 23*c*, when the first power supply 21 and the second power supply 22 function normally, the 8V-DC power and the 7.5V-DC power that are forwardly biased are applied to the diodes D1 and D2, respectively. As a result, when the first power supply 21 and the second power supply 22 function normally, the potential at the cathode of the diode D1 is higher than the potential at the cathode of the diode D2, and the potential at the cathode of the diode D1 forms the voltage outputted from the first protection section 23*c*. Therefore, in this case, the 8-V DC power is supplied to the firmware 23*b* and causes the firmware 23*b* to operate.

On the other hand, when failure occurs in the electric power conversion section 21*f* in the first power supply and the electric power conversion section 21*f* stops outputting electric power, the potential at the anode of the diode D1 is not 8 V any more. In this case, when the second power supply 22 functions normally, the 12-V DC power is supplied to the DC-DC converter 23*c*1 via the control computer 24, and 7.5 V is therefore applied to the anode of the diode D2. As a result, the diode D2 is forwardly biased and the diode D1 is reversely biased, and the potential at the cathode of the diode D2 forms the voltage outputted from the first protection section 23*c*. Therefore, in this case, the 7.5-V DC power is supplied to the firmware 23*b*. Since 7.5 V is a voltage value slightly smaller than 8 V, the firmware 23*b* operates also with the 7.5-V DC power.

The potential at the cathode of the diode D2 is normally lower than the potential at the cathode of the diode D1, and when the electric power conversion section 21*f* stops outputting electric power, the DC-DC converter 23*c*1 only needs to output voltage that allows the firmware 23*b* to operate based on the potential at the cathode of the diode D2. The voltage slightly smaller than 8 V is therefore not limited to 7.5 V as long as the voltage falls within the range that allows the firmware to operate.

As described above, when failure has occurred in the electric power conversion section 21*f*, the protection circuit 21*c* functions to cause the electric power conversion section 21*f* to stop outputting electric power, and in this state, the register in the protection circuit 21*c* shows a value corresponding to a cause of the occurrence of the error, and the value shows that an error has occurred. Since the function of the first protection section 23*c* does not cause the firmware 23*b* to stop operating but allows the firmware 23*b* to operate normally, the firmware 23*b* can detect that an error has occurred in the electric power conversion section 21*f* and identify a cause of the occurrence of the error based on the register in the protection circuit 21*c*. The firmware 23*b* then outputs information representing that the error has occurred and the cause of the occurrence of the error to the control computer 24 and records the information in the nonvolatile memory 24*a*. Therefore, after the failure has occurred, a user can identify the location where the error has occurred and a cause of the occurrence of the error by referring to the information recorded in the nonvolatile memory 24*a*, whereby the user can perform repair or otherwise handle the failure.

In the state in which there is a circuit that functions as a sensor for error detection (such as protection circuit 21*c* described above), a variety of configurations can be employed as the configuration for keeping electric power supply (for example, keeping supply of electric power to register) even when failure occurs. For example, a configuration in which the voltage outputted from the first protection section 23c allows the protection circuit 21c to operate allows electric power supply to the protection circuit 21c to be maintained even when failure occurs in the electric power conversion section 21f. Instead, a circuit that functions as a sensor for error detection may be configured to receive electric power from a circuit that is not a subject detected by the sensor circuit. For example, an employable configuration is a configuration in which the protection circuit 21c in the electric power conversion section 21f receives electric power from the electric power conversion section 21d, the electric power conversion section 21e, or the second power supply 22, any of which is a circuit other than the electric power conversion section 21f. In this case, when the voltage outputted from a circuit other than the electric power conversion section 21f differs from the voltage that causes the protection circuit 21c to operate, the former voltage value may, of course, be converted, for example, with a converter.

The sensor may, of course, be so configured that it is provided with no special circuit for maintaining the electric power supply in order to acquire error information. For example, in the configuration described above, a register that holds information representing that the protection circuit 21c or any other circuit has functioned (error has occurred) may be formed in the firmware 23b. According to the configuration described above, which ensures that the first protection section 23c allows electric power supply to the firmware 23b to be maintained, even when failure has occurred in the electric power conversion section 21f or any other component and the electric power conversion section 21f has stopped outputting electric power, information representing that the error has occurred can be held.

(3) Other Embodiments

The embodiment described above is an example for implementing the invention, and a variety of other embodiments can be employed as long as when one of two types of power supply stops outputting electric power, the other supplies electric power. For example, the robot 10 does not necessarily have the aspect shown in FIG. 1A and may instead be a double-arm robot, a humanoid robot, a scalar robot, or any other robot.

Further, the firmware 23b forms the first circuit in the embodiment described above, and any of the variety of other elements that form the robot 10 can be the first circuit. For example, when the voltage outputted from the electric power conversion section 21e or 21f is considered as the first voltage, the drive unit 30 or the display control section 23a can be the first circuit. In this case, the first protection section produces the 280-V AC power or the 24-V DC power based on the voltage outputted from the second power supply 22 at the time of failure, and the produced power allows the first circuit to operate. The former configuration, in which the electric power required for the drive unit 30 is not interrupted even instantaneously at the time of failure, can prevent the drive unit 30 from being damaged. The latter configuration, in which the LED display can display an alarm at the time of failure, can quickly notify a user of occurrence of failure and the location where the failure has occurred. The alarm issuing device may, of course, be a buzzer or any other sound output device. Further, a plurality of circuits in the firmware 23b, the display control section 23a, and the drive unit 30 may instead be the first circuit. Moreover, assuming that the first power supply 21 and the second power supply 22 are swapped with each other, the control computer 24 may function as the first circuit.

Further, a configuration that suppresses an abrupt change in the output from the first power supply at the time of failure may be provided. For example, a capacitor that is charged in normal operation or a choke coil that suppresses an abrupt change in current may suppress an abrupt change in the output from the first power supply when the first power supply stops outputting electric power.

Further, when the first power supply stops outputting the first voltage, the first protection section may cause the first circuit to operate based on the second voltage, and a process of terminating the action of the robot 10 may be carried out at the same time. That is, the robot 10 is so configured that when some type of failure has occurred, the action of the robot 10 is automatically terminated because it is not appropriate to allow the robot 10 keep operating. Specifically, the control computer 24 or the controller 23 controls the drive unit 30 to cause it to gradually stop operating so that no breakage due to abrupt stoppage of action of the arm or any other portion occurs. For example, the firmware 23b outputs a control signal to the electric power conversion section 21d to cause it to control the three-phase AC power in such a way that the motors gradually stop the joints of the robot 10 (the joints stop without exerting excessive load on reduction gears). When failure has occurred in the electric power conversion section 21d, the three-phase AC power cannot be outputted in some cases. In such cases, for example, a large-capacitance capacitor may be provided in the electric power conversion section 21d, and the capacitor may supply electric power to rotate the shafts of the motors in such a way that the joints of the robot 10 gradually stop.

Figure 2B:
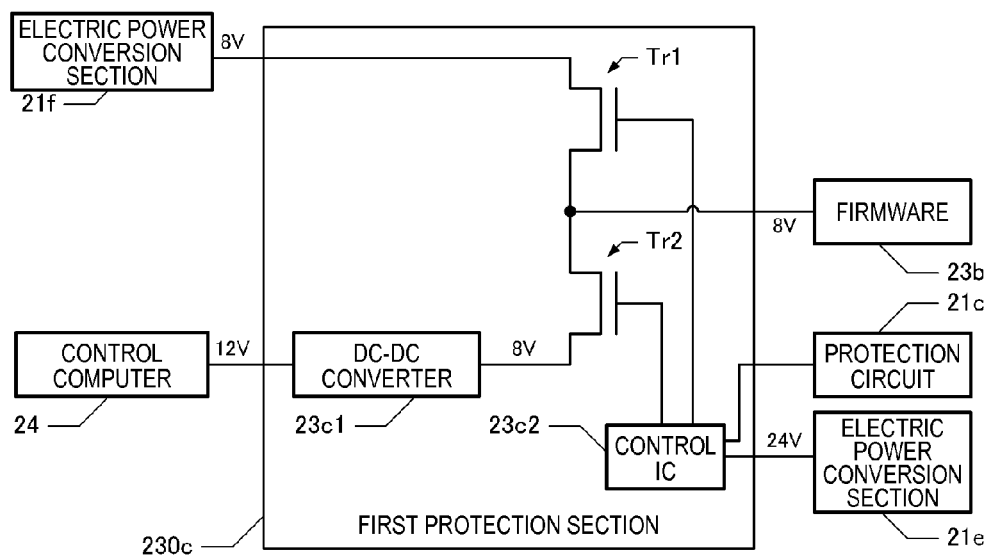

Further, the first protection section 23c is not necessarily configured as shown in FIG. 2A described above. For example, an IC that detects whether or not failure has occurred may be provided, and the IC may switch the source of the first voltage from one to the other. FIG. 2B shows an example of the configuration of the first protection section. In FIG. 2B, a first protection section 230c is employed in replace of the first protection section 23c shown in FIG. 1B, and the components other than the first protection section 230c are the same as those shown in FIG. 1B. Further, in FIG. 2B, the same components as those in FIGS. 2A and 1B have the same reference characters (it is, however, noted that the DC-DC converter 23c1 outputs a voltage of 8 V).

The first protection section 230c includes transistors Tr1, Tr2, the DC-DC converter 23c1, and a control IC 23c2, as shown in FIG. 2B. The transistor Tr1 is located in a power line that connects the electric power conversion section 21f to the firmware 23b and interposed between the electric power conversion section 21f and the firmware 23b. The transistor Tr1 is controlled by the control IC 23c2. That is, the control IC 23c2 can switch a state in which conduction is established between the electric power conversion section 21f and the firmware 23b to a state in which no conduction is established therebetween and vice versa.

The transistor Tr2 is located in a power line that connects the DC-DC converter 23c1 to the firmware 23b and interposed between the DC-DC converter 23c1 and the firmware 23b. The transistor Tr2 is also controlled by the control IC 23c2. That is, the control IC 23c2 can switch a state in which conduction is established between the DC-DC converter 23c1 and the firmware 23b to a state in which no conduction is established therebetween and vice versa.

In a normal state (no failure has occurred in electric power conversion section 21f), the control IC 23c2 controls the transistors Tr1 and Tr2 to turn on the transistor Tr1 and turn off the transistor Tr2. As a result, in the normal state, conduction between the electric power conversion section 21*f* and the firmware 23*b* is established, but no conduction between the DC-DC converter 23*c*1 and the firmware 23*b* is established. That is, 8 V produced by the electric power conversion section 21*f* is applied to the firmware 23*b*.

Further, the control IC 23*c*2 is connected to the protection circuit 21*c*, and when the register in the protection circuit 21*c* shows that an error has occurred, the control IC 23*c*2 detects, based on the value of the register, that the electric power conversion section 21*f* has stopped outputting electric power. In this case, the control IC 23*c*2 further controls the transistors Tr1 and Tr2 to turn off the transistor Tr1 and turn on the transistor Tr2. As a result, no conduction is established between the electric power conversion section 21*f* and the firmware 23*b*, but conduction is established between the DC-DC converter 23*c*1 and the firmware 23*b*. That is, 8 V produced by the DC-DC converter 23*c*1 is applied to the firmware 23*b*.

According to the configuration described above, when the first power supply 21 stops outputting the 8-V DC power, the firmware 23*b* is allowed to operate based on the 12-V DC power outputted from the second power supply 22. FIG. 2B shows an example in which the control IC 23*c*2 operates with electric power supplied from the electric power conversion section 21*e*, which is a power supply other than the electric power conversion section 21*f*. Electric power from any other power supply, for example, the 5-V DC power from the second power supply 22 may, of course, be supplied to the control IC 23*c*2.

Figure 2C:
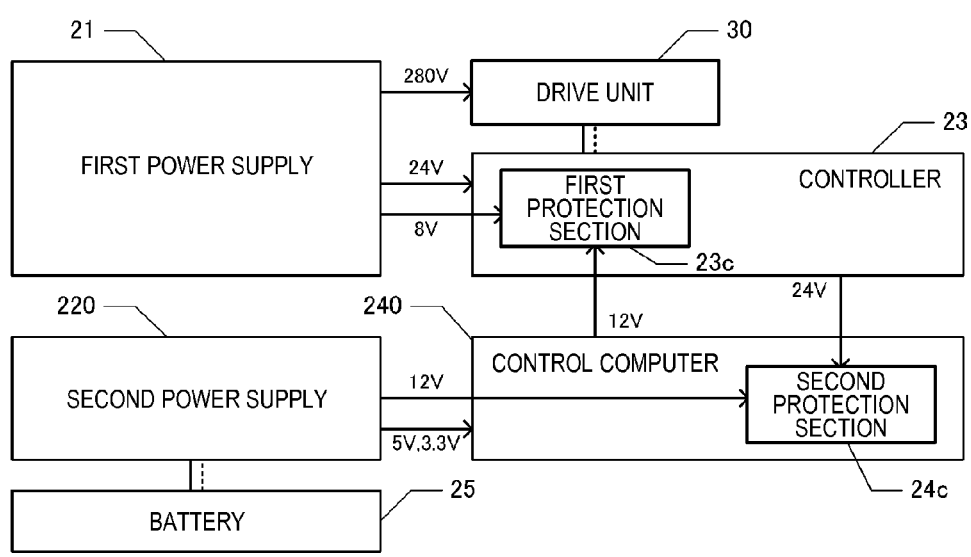
FIG. 2C shows a configuration for improving failure resistance of the first power supply and a second power supply.

Further, a configuration in which the control computer 24 is so protected that it does not stop operating when failure occurs in the second power supply 22 may be employed. Moreover, the first or second power supply may include an auxiliary power supply. FIG. 2C shows a configuration in which a second protection section 24*c*, which causes the second circuit to operate based on the first voltage when the second power supply stops outputting the second voltage as in the configuration shown in FIG. 1B, is provided and a battery as an auxiliary power supply is connected to the second power supply. In FIG. 2C, the same components as those in FIG. 1B have the same reference characters.

Specifically, a control computer 240 as the second circuit is provided with the second protection section 24*c*. The second protection section 24*c* includes a circuit that converts the 24-V voltage outputted from the first power supply 21 into 12-V voltage when a second power supply 220 stops outputting 12-V voltage. As a specific configuration of the circuit, the circuit configuration shown in FIG. 2A or 2B can be employed. An employable configuration is, for example, as follows: The second protection section 24*c* supplies the anode of the diode D1 with the 12-V DC power derived from the second power supply 220, converts the 24-V DC power derived from the first power supply 21 via the controller 23 into 12-V DC power, and supplies the anode of the diode D2 with the 12-V DC power; and one of the voltages outputted from the cathodes of the diodes D1 and D2 is used in a circuit in the control computer 24 (circuit that operates with 12-V DC power). According to the configuration, even when the second power supply 220 stops supplying the 12-V DC power, the control computer 24 is allowed to keep operating.

Further, a battery 25 is connected to the second power supply 220, and when external power supply to the second power supply 220 (power supply from commercial power supply 40) is stopped, the second power supply 220 can receive electric power supply from the battery 25 and operate normally. Therefore, 12-V, 5-V, and 3.3-V DC-power, among which the 12-V DC power corresponds to the 12-V DC voltage as the second voltage, can be produced and supplied to the control computer 240. Therefore, even when power cut or any other failure occurs and the external power supply is stopped, the control computer 240 operates normally. In this case, the control computer 240 may, of course, carry out a process of stopping the robot 10 while the electric power is left in the batter 25.

When power cut or any other failure occurs and the external power supply is stopped, the first power supply 21 stops outputting electric power. In this case, the first protection section 23*c* receives electric power of 12 V as the second voltage supplied from the second power supply 220 and causes the firmware 23*b* to operate. As a result, the firmware 23*b* carries out processes of acquiring information representing a monitored subject where an error has occurred and a cause of the occurrence of the error and recording the information in the nonvolatile memory 24*a*. A user can therefore analyze the monitored subject where the error has occurred and the cause of the occurrence of the error. The circuit caused to operate by the first protection section 23*c* may, of course, include a circuit other than the firmware 23*b*, and employing a configuration in which the first protection section 23*c* causes the display control section 23*a* and the drive unit 30 to operate allows the robot 10 to keep acting normally even when power cut or any other failure occurs and the external power supply is stopped. Therefore, before the external power supply is restored, the battery 25 is used to cause the robot 10 to act, and after the external power supply is restored, the electric power supply from the battery 25 is stopped and switched to the external power supply, whereby the robot 10 having high failure resistance can be provided.

Further, in the configuration described above, error information acquired at the time of failure contains information representing a cause of occurrence of the error, and the information may further contain other types of information, such as information representing the state of action of a component of the robot 10 (such as angle and position of joint).

Further, the portions where the first protection section 23*c* and the second protection section 24*c* are formed are not limited to the controller 23 and the control computer 24 described above and may be other portions, for example, the first power supply 21 and the second power supply, or at least one of the first protection section 23*c* and the second protection section 24*c* may be formed on an independent substrate and incorporated in the robot 10.

The entire disclosure of Japanese Patent Application No. 2014-215124, filed Oct. 22, 2014 is expressly incorporated by reference herein.

What is claimed is:

1. A robot comprising:
 a first power supply that outputs a first voltage;
 a first circuit that receives the first voltage and monitors errors associated with control of the robot using the first voltage;
 a second power supply that outputs a second voltage that is greater than the first voltage;
 a second circuit that operates with the second voltage;
 and a first protection section that receives the first voltage from the first power supply and the second voltage from the second circuit, that provides the first voltage to the first circuit, that detects when the first power supply stops outputting the first voltage, and that selectively converts the second voltage to a third voltage to cause the first circuit to operate based on the third voltage in response to detecting that the first power supply has stopped outputting the first voltage, wherein the first circuit continues to monitor the errors associated with control of the robot using the third voltage after the first power supply stops outputting the first voltage, wherein the first protection section includes a first diode that receives the first voltage from the first power supply, and a conversion section that converts the second voltage into the third voltage, wherein the third voltage is less than the first voltage and, provides the third voltage to a second diode, wherein outputs of the first diode and the second diode are connected together.

2. The robot according to claim 1, wherein, when the first power supply stops outputting the first voltage, the first protection section causes the first circuit to operate by using the third voltage produced by the conversion performed by the conversion section.

3. The robot according to claim 1, wherein the first circuit includes an error recording section that carries out processes of acquiring an error having occurred in a component of the robot and recording the error in a nonvolatile memory.

4. The robot according to claim 3, wherein the nonvolatile memory is connected to the second circuit, the first circuit outputs information representing the acquired error to the second circuit, and the second circuit acquires the information representing the error and records the information in the nonvolatile memory.

5. The robot according to claim 3, wherein the component of the robot includes the first power supply.

6. The robot according to claim 1, further comprising a second protection section that causes the second circuit to operate based on the first voltage when the second power supply stops outputting the second voltage.

7. The robot according to claim 1, wherein the second circuit includes a battery, and when external electric power supply to the second power supply is stopped, the second circuit outputs the second voltage based on electric power from the battery.

* * * * *